United States Patent [19]

Adams et al.

[11] Patent Number: 5,222,022
[45] Date of Patent: Jun. 22, 1993

[54] METHOD AND APPARATUS FOR ITERATED DETERMINATIONS OF SENSED SPEED AND SPEED GOVERNING

[75] Inventors: Larry L. Adams; Daniel C. Garvey, both of Fort Collins, Colo.

[73] Assignee: Woodward Governor Company, Rockford, Ill.

[21] Appl. No.: 624,492

[22] Filed: Dec. 6, 1990

Related U.S. Application Data

[63] Continuation of Ser. No. 512,091, Apr. 11, 1990, abandoned, which is a continuation of Ser. No. 936,353, Dec. 1, 1986, abandoned.

[51] Int. Cl.[5] .................. G06F 15/20; F02D 41/00
[52] U.S. Cl. .................. 364/431.07; 364/565; 123/414; 123/418
[58] Field of Search .......... 364/431.07, 431.04, 364/565; 123/414, 416, 417, 418, 419

[56] References Cited

U.S. PATENT DOCUMENTS

| | | | |
|---|---|---|---|
| 4,156,411 | 5/1979 | Crall et al. | 364/414 |
| 4,265,210 | 5/1981 | Hanisko | 123/490 |
| 4,284,052 | 8/1981 | Hanisko | 123/476 |
| 4,404,942 | 9/1983 | Asami | 364/431.07 |
| 4,434,470 | 2/1984 | Thomas et al. | 364/565 |
| 4,527,248 | 7/1985 | Takase et al. | 364/565 |
| 4,566,069 | 1/1986 | Hirayama et al. | 364/565 |
| 4,572,130 | 2/1986 | Tsukamoto | 123/357 |
| 4,600,866 | 7/1986 | Seto | 318/313 |
| 4,600,867 | 7/1986 | Hayashi et al. | 318/341 |
| 4,633,423 | 12/1986 | Bailey | 364/571 |
| 4,633,838 | 1/1987 | Fukui | 123/488 |
| 4,635,201 | 1/1987 | Izumi | 364/431 |
| 4,697,561 | 10/1987 | Citron | 364/431.07 X |
| 4,700,305 | 10/1987 | Lotterbach et al. | 123/414 X |
| 4,760,827 | 8/1988 | Schreiber et al. | 123/414 |

FOREIGN PATENT DOCUMENTS

| | | |
|---|---|---|
| 82300906.3 | 2/1982 | European Pat. Off. |
| 81401924.6 | 8/1982 | European Pat. Off. |
| 3329800A1 | 2/1985 | Fed. Rep. of Germany |
| 3446611A | 7/1985 | Fed. Rep. of Germany |
| 3506233A1 | 10/1985 | Fed. Rep. of Germany |
| 58-144755 | 11/1983 | Japan |
| 3179/68 | 9/1970 | United Kingdom |
| 2173925A | 10/1986 | United Kingdom |

Primary Examiner—Vincent N. Trans
Attorney, Agent, or Firm—Leydig, Voit & Mayer

[57] ABSTRACT

Methods and apparatus, preferably carried out with the aid of a programmed digital computer for iteratively determining the actual speed of an engine and iteratively updating a fuel rate command signal so as to govern and correctively remove any errors from the set point speed. Jumps to a program subroutine are triggered by sensing the engine crankshaft to generate a predetermined number Q of pulses during the span of one revolution (where Q is an integer greater than 1), and each pass through the subroutine determines the actual engine speed as an average over the last whole revolution of the crankshaft. There are thus Q iterations per revolution but each interation signals the speed over one whole revolution. This results in wholly eliminating torsionally induced speed fluctuations, or the like, from the determined speed signal. Each pass through the program subroutine also determines the speed error and updates the fuel rate command signal as a PID function of such error. Because this iterated updating occurs, not at a regularly timed rate, but at intervals which vary inversely with speed, the instructions of the subroutine program can be made very short and simple while nevertheless causing effective automatic tuning adjustments of the integral gain, stability and compensation factors.

2 Claims, 5 Drawing Sheets

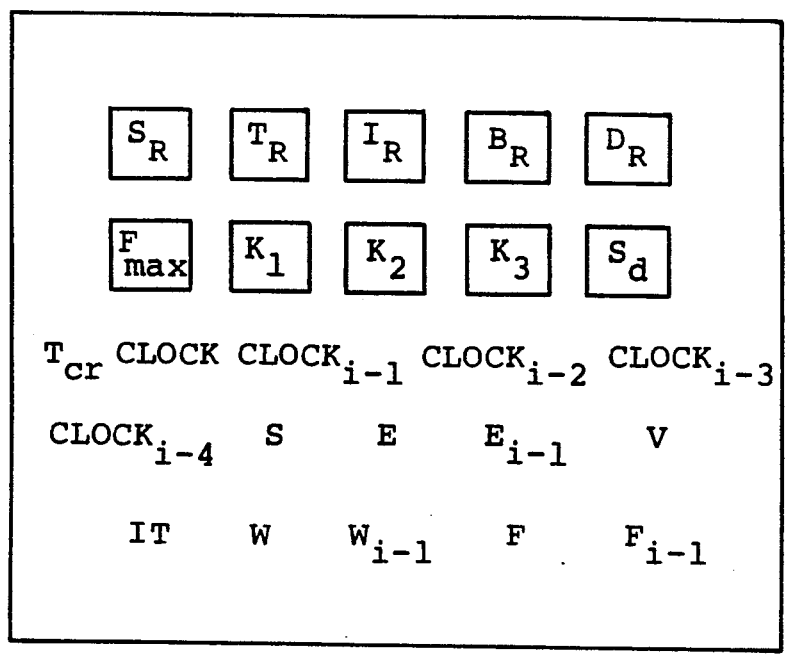
FIG. 3
FIG. 5
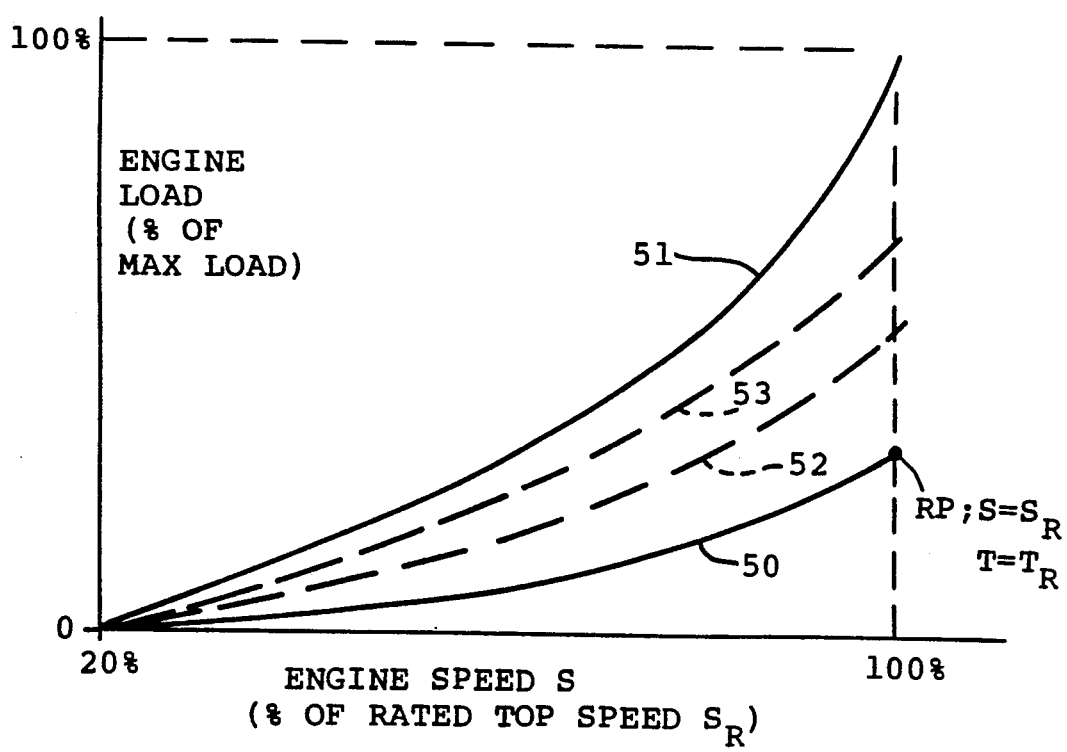

METHOD AND APPARATUS FOR ITERATED DETERMINATIONS OF SENSED SPEED AND SPEED GOVERNING

This is a continuation of copending application(s) Ser. No. 07/512,091 filed on Apr. 11, 1990, now abandoned and Ser. No. 06/936,353, filed Dec. 1, 1986, now abandoned.

The present invention pertains in general to the sensing and controlling of the speed of a rotating shaft, and more particularly to methods and apparatus by which actual speed is determined and correctively restored to a desired value by iterating procedures and computations, preferably with the aid of a programmed digital computer.

BACKGROUND ENVIRONMENT; SUMMARY OF PROBLEMS

While the invention may find advantageous use in other applications, it has been conceived and adopted in systems for governing the speed of multicylinder engines. In such systems, closed loop action for speed governing involves sensing and signaling the actual rotational speed of the engine output shaft, subtractively comparing the actual speed with a signaled adjustable set point speed to determine the sign and magnitude of any speed error, producing a command signal for the rate of fuel input to the engines and which changes according to a function of the speed error, and establishing or adjusting the input fuel rate according to the command signal so as to hold any speed error at or restore it essentially to zero even when abrupt and/or large changes in the engine load or the set point occur. As a general class, such a speed governing system is a closed loop control; it is preferably and commonly arranged so that corrective adjustment in the command signal and the fuel input rate are effected as "proportional-integral-derivative" (PID) function of the speed error. By providing PID responsive action to speed errors, the magnitude and durations of transient departures due to load changes can be at least approximately optimized (reduced) for the inherent transfer function (gains, phase lags and dead times) of the particular engine and load device which are being controlled. This involves tailoring or tuning the governor gain, stability and compensation factors to provide the best compromise between (i) avoidance of instability or oscillation which may result when the gain is too high, and (ii) slow or sluggish elimination of any transient speed error—which is the penalty when the gain is too low.

In speed governoring systems which utilize a programmed digital computer to create the command signal by iterated computations based upon the difference (error) between the sensed actual speed and the desired speed set point, the choice of "sampling time" or iteration rate interacts with the chosen gain of the PID function to impose alternatives or compromises that are all undesirable. If the computer iterates through its governing program to update the command signal at short repetition intervals, then the sensed speed signal will reflect torsional (or similar) instantaneous speed fluctuations and the speed error will cyclically change over the span of one revolution of the engine shaft. If the gain of corrective action is made high, then the governing controller will tell the fuel-determining actuator to change its position by significant amounts even when the average speed is essentially constant; and the fuel-rate adjusting mechanism will mechanically vibrate or oscillate to such an extent that it will literally wear itself out far short of any reasonably acceptable service life. If the gain is reduced to essentially eliminate such destructive mechanical vibrations, then the corrective response to transient errors in average shaft speed becomes intolerably slow.

On the other hand, if the computer iterates through its governing program to update the command signal at long repetition intervals, then changes in average speed will not be seen until long after they start to occur—and if the gain of the corrective action is made high to "make up" for delay, then corrective action will have phase lags which can easily result in instability and sustained osillations.

Regularly timed iterations, at a chosen and thereafter fixed rate, of a real time digital computer program to correctively adjust engine fuel input rate may be so short as to "see" the torsionally induced speed fluctuations when average engine shaft speed is in the low region of its operating range, and yet so long as to result in slow or sluggish response when the average shaft speed is in the high region of its operating range.

OBJECTS AND ADVANTAGES OF THE INVENTION

It is the general aim of the invention to provide a method and apparatus for iterated determinations of speed, and iterated corrective action to remove speed errors, which overcomes the problems arising from instantaneous speed fluctuations such as torsionally induced speed variations.

More particularly, it is a major objective of the invention to provide a method and apparatus for iteratively determining and signaling the actual value of the speed of a rotating shaft, the actual speed signal being wholly "blind" to and free of any influences from instantaneous speed fluctuations (such as torsional speed variation in a multicylinder engine) which occur repetitively at a frequency which is equal to or a multiple of the shaft rotation frequency.

In this latter aspect, another object of the invention is to eliminate the deleterious effect of any weak or disabled cylinder in the determinations and control of the speed of a multicylinder engine.

Still another object is to provide a method and apparatus for determining and governing engine speed which both (i) avoids mechanical vibration and undue wear of a fuel rate actuator and (ii) permits use of reasonably high gain to eliminate unacceptable slowness in removing speed errors.

A further object of the invention is to provide a method and apparatus for sensing and signaling actual speed of an engine, and to iterate a corrective adjustment of any speed error, not at regularly timed instants but at a repetition rate which increases or decreases as engine speed increases or decreases—so that the influence of the iteration rate as the controlled engine speed changes aids in avoiding both instability and sluggish correction of speed errors.

It is also an objective of the invention to provide a method and apparatus, with the aid of a programmed digital computer, for governing the speed of a given engine driving a given load device with PID action, and wherein the integral gain, stability, and compensation factors are, in net effect, automatically adjusted by open loop adaptive action as the controlled entity (engine and load device) operate in different regions of its speed-load characteristics.

And it is still another object to achieve the foregoing by repeated execution of a programmed subroutine which is amazingly short and simple in its instructions, and thus capable of being executed with consumption of relatively little computer time.

BRIEF DESCRIPTION OF DRAWING FIGURES

FIG. 3 is a partial map of addresses or words in the data memory of the digital computer shown in FIG. 1;

Figure 1:
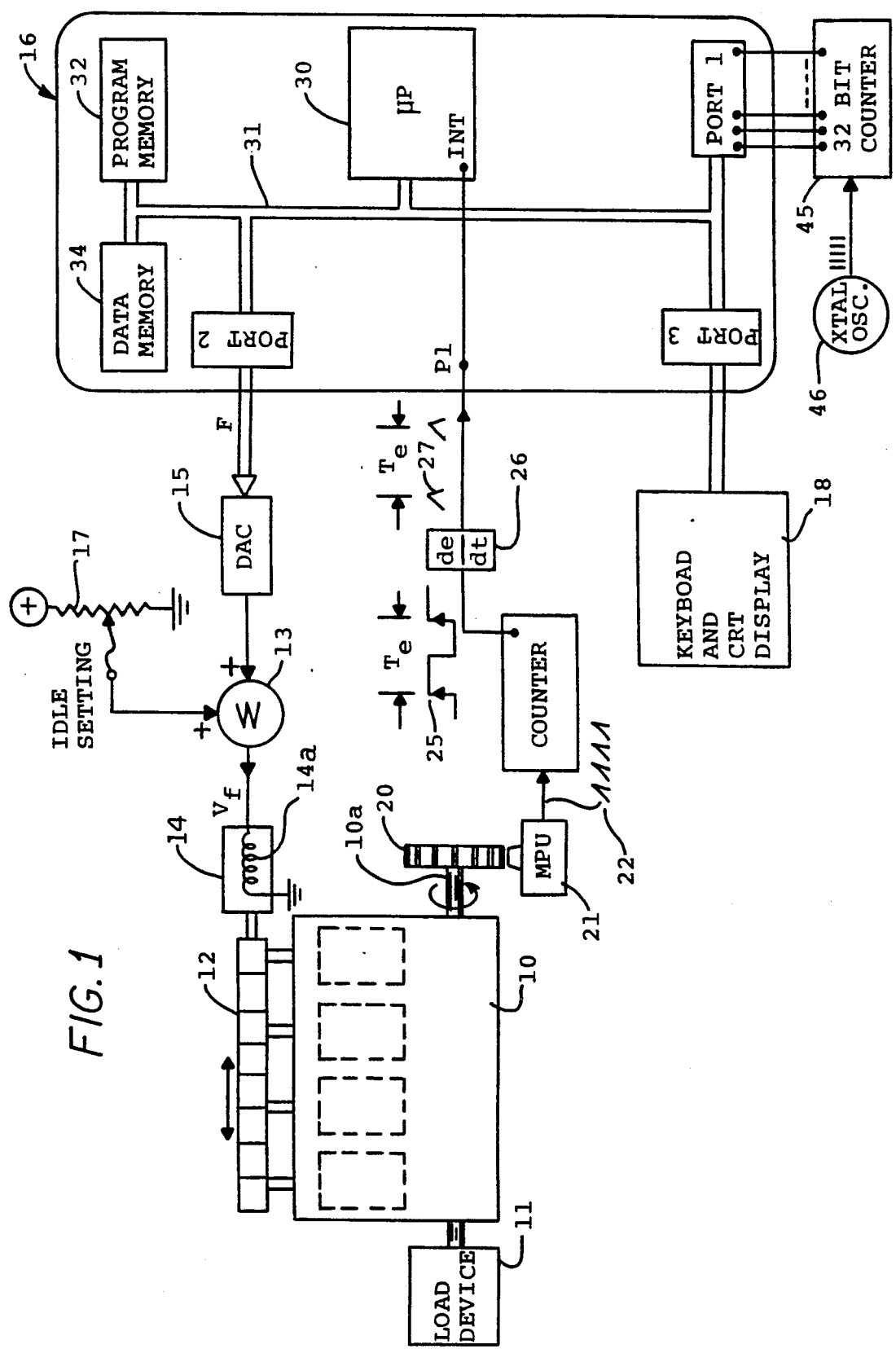
FIG. 1 is a diagrammatic illustration of a typical engine driving a load device and associated with a speed sensing and governing system which executes the method of, and embodies the apparatus of, the present invention.
Figure 6:
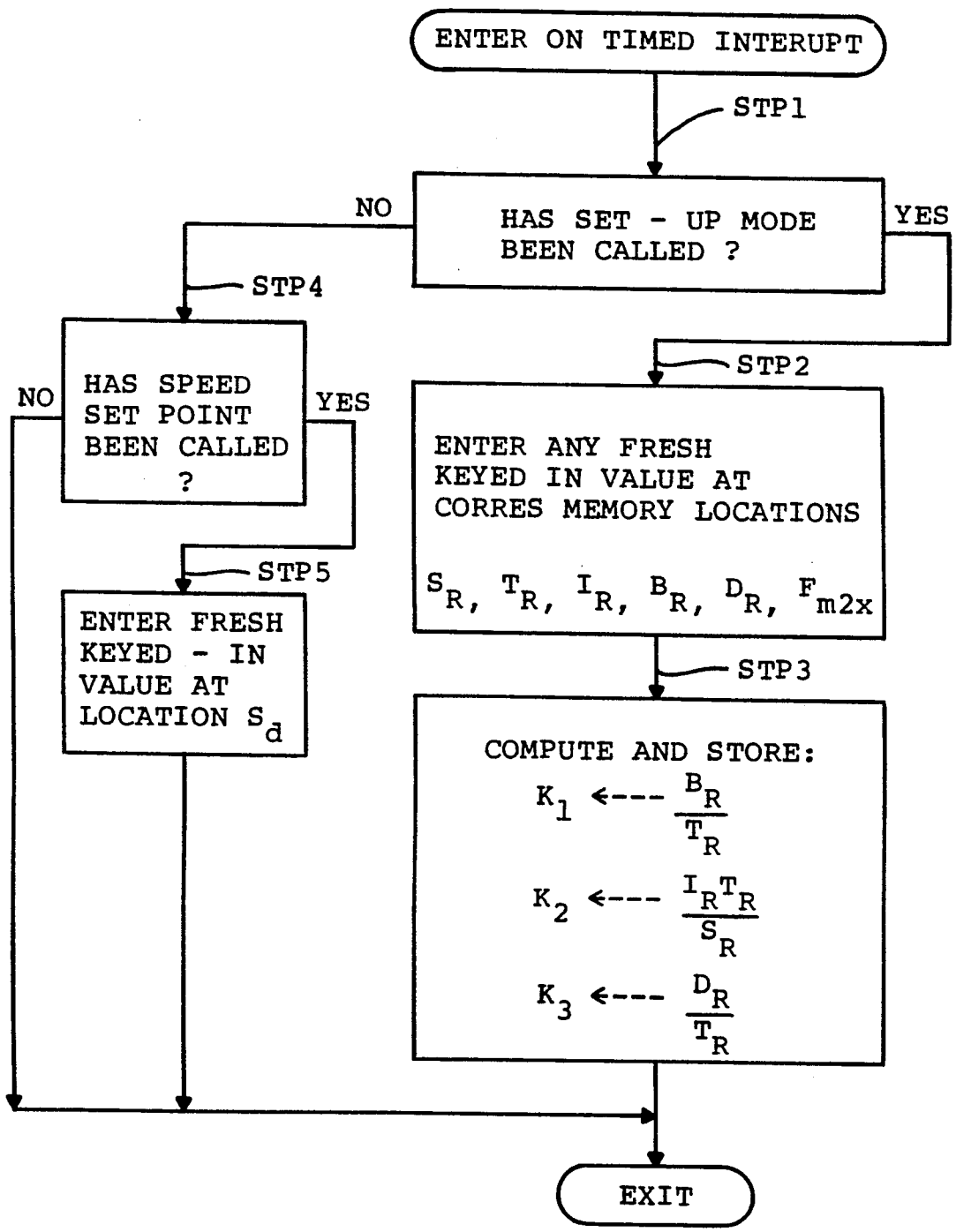

FIG. 5 is a graphical plot of the speed-load characteristics of a typical engine-load device entity controlled by the speed governing system here to be described, such plot sometimes being referred to as the "operational map" for the engine-load combination; and FIG. 6 is a flow chart, in simplified form, of a keyboard service program subroutine loaded into the program memory of the digital computer shown in FIG. 1 so as to permit storage of certain predetermined, but changeable, constants in the data memory.

While the invention has been shown and will be described in some detail with reference to a particular embodiment as an example, there is no intention thereby to limit the invention to such detail. On the contrary, it is intended here to cover generically all modifications, alternatives and equivalents which fall within the spirit and scope of the invention as defined by the appended claims.

DETAILED DESCRIPTION OF ONE EMBODIMENT

A closed loop speed governing system is diagrammatically illustrated in FIG. 1 as associated with and acting upon a multi-cylinder internal combustion engine 10 coupled to drive a load device 11 which presents a changeable torque. Merely as an example, it will be assumed that the engine is a four cylinder, two-cycle diesel, and the load will be assumed to be constituted by an adjustable pitch propeller acting in water to propel and maneuver a ship. In a general sense, the engine may be characterized by a number C where C is equal to the number of cylinders if of the two-cycle category, or where C is equal to one half the number of cylinders if of the four-cycle category. In both cases one cylinder "fires" at instants in time when the crankshaft has turned through 360°/C from the firing of the previous cylinder.

As shown in FIG. 1, the engine 10 is controlled by linearly shifting a fuel rack 12 whose position determines the rate of fuel fed in by unit injectors associated with the respective cylinders. The rack 12 is moved to various positions by a linear electromagnetic actuator 14 having a winding 14a connected to receive a variable d.c. voltage $V_f$. The voltage $V_f$ is the output from a summing circuit 13 which receives (i) a minimum fuel or idle voltage from a potentiometer 17 and (ii) the output from a digital-to-analog converter 15. The DAC 15 receives a multibit binary digital output signal F—which by its numerical value commands the fuel input rate—from PORT 2 of a programmed, continuously running digital microcomputer 16.

The purpose of the governor system is to keep the actual engine speed S equal to the set point or "desired" speed $S_d$—and to restore the equality quickly (with minimum delay) and without instability or hunting, when changes in load or speed set point give rise to speed errors. The set point $S_d$ is fed into a word of memory in the microcomputer by entry through a keyboard and CRT display unit 18 coupled to input/output PORT 3. The set point represents desired speed in revolutions per minute or revolutions per second and may be keyed in via the keyboard in known and conventional fashion.

The actual speed S of the engine is determined within the computer 16, in a manner to be explained, from signals originating at a transducer associated with some engine part which rotates at or in timed relation to the actual speed of the crankshaft. As here shown, a toothed gear or wheel 20 is mounted on the crankshaft 10a, and a magnetic pick-up 21 is disposed adjacent the wheel periphery. As each tooth passes, the MPU 21 produces one pulse; thus its train of output pulses 22 has a nominal frequency proportional to actual engine speed and a period between successive pulses which is inversely proportional to that speed. A binary counter 24 receives the pulses 22 and acts as a frequency divider. If the gear 20 has a total of M teeth and the counter "rolls over" to produce a positive going wavefront in its output signal 25 each time it has received P pulses, then the nominal frequency of the pulse train 22 is $$f_{22} = MS \text{ (where S is in rev./sec.)} \quad (1)$$

and the nominal frequency of the counter output 25 is $$f_{25} = \frac{MS}{P} \quad (2)$$

The output 25 of the counter may be sent through a polarized voltage differentiator 26 to produce train of sharp pulses 27 which correspond in frequency and time spacing to the frequency and period of the wave 25.

The signals 27 are applied to a single bit input port P1 of the microcomputer and serve to trigger an interrupt or jump to a governor subroutine or algorithm, as explained below.

The number of teeth M and the frequency dividing factor P may be given any fixed values as a matter of design choice. They determine the angular displacement $\Delta\theta$ through which the crankshaft turns in the interval between two successive pulses 27. That is, $$\Delta\theta = \frac{P}{M} \cdot 360° \quad (3)$$

As explained later, however, it is possible to omit the counter 22 and cause successive values of $\Delta\theta$ to correspond to the angular spacings of just a few teeth on the wheel 20.

As will become apparent as the description proceeds, and in accordance with one aspect of the invention, the elapsed time Tcr during which the crankshaft 10a turns one whole revolution (360°) is numerically represented by the value of a digital signal (here called Tcr) on an iterative basis. Although particular units and scaling factors may be chosen as desired, if Tcr is in units of seconds, then the reciprocal of Tcr is a changeable value S in units of revolutions per second. Both of the values for Tcr and S are signaled anew in response to the appearance of a pulse 27; but the elapsed time Tcr corresponds to the interval between the last-received pulse 27 and the Qth preceding pulse, where Q is the quantity of pulses 27 which appear during one revolution of the crankshaft.

The microcomputer 16 is conventional (except for the loaded instruction program treated later) and it need not be described in more than general terms. It includes a microprocessor 30 (with a CPU, instruction address counter, and clock, not shown) coupled to a combined address and data bus 31 leading to a program memory 32, a data memory 34, and multibit PORTS 1, 2 and 3. The single bit input port P1 leads to the interrupt terminal INT on the microprocessor. The keyboard and CRT display unit 18 is connected and functions in the usual fashion. The program memory 32 is loaded with an instruction program which may embrace several tasks performed by time sharing with interrupts and jumps between different separately identifiable sub-routines. Only the sub-routines associated with governing action need be considered in the present case.

Figure 2:
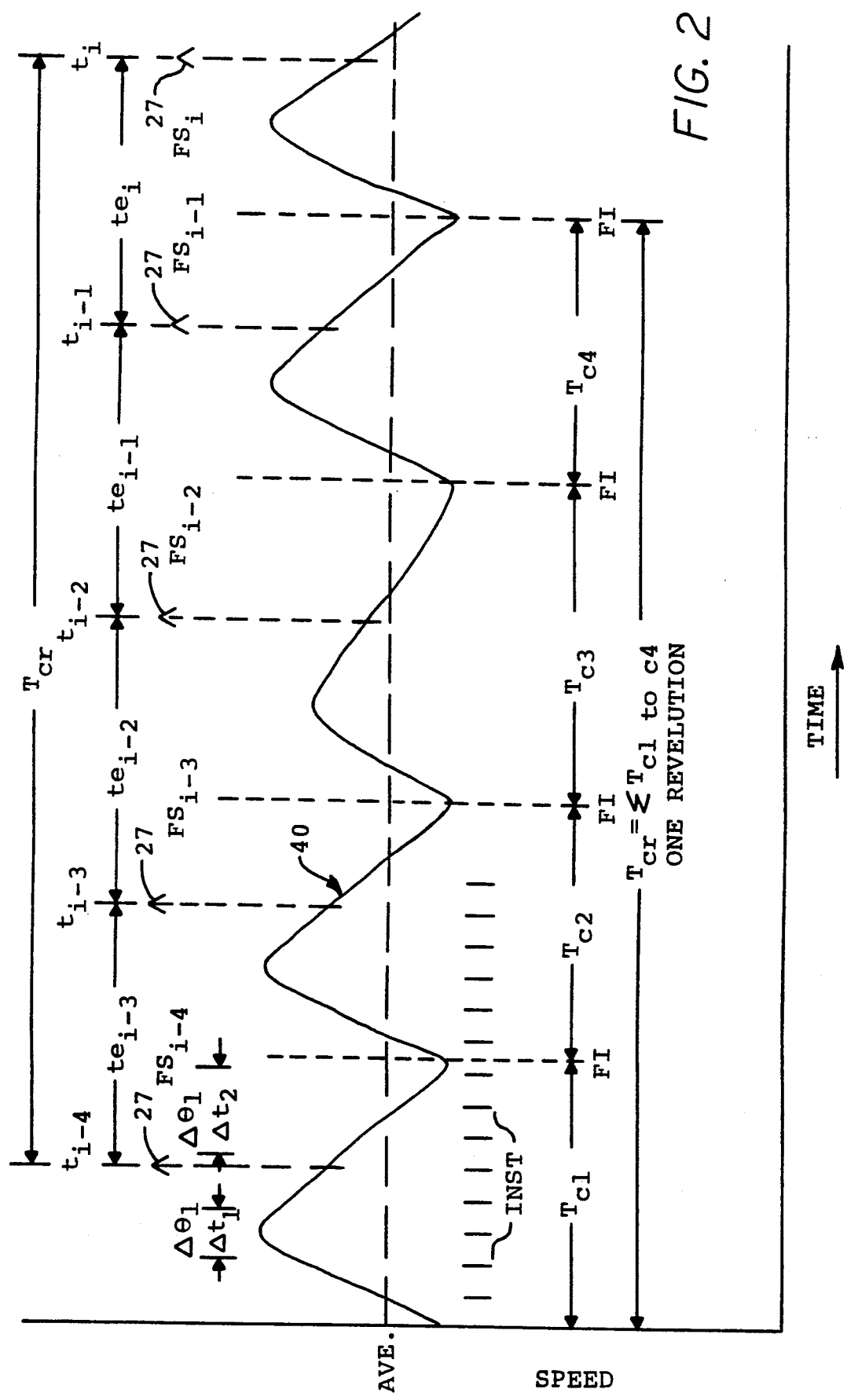
FIG. 2 is a graphical plot which represents instantaneous speed of the engine crankshaft versus time, and which aids in understanding the timing relationships by which the changeable actual speed is iteratively determined and signaled.

FIG. 2 graphically illustrates (in generalized, non-rigorous fashion) by curve 40 the value of instantaneous engine speed plotted against time for a four-cylinder, two-cycle engine. The beginning of each of the time periods $T_{c1}$ through $T_{c4}$ represents the instant at which one cylinder "fires", thereby causing instantaneous speed to rise sharply and then fall off until the next cylinder fires. The firing instants FI occur at the end of each $360°/C=90°$ of crankshaft rotation; but the lengths of successive firing time intevals $T_c$ are not necessarily equal even when steady state conditions prevail (load and fuel input rate are constant) and the average speed AVE over one whole revolution is constant. This may be seen in FIG. 2 where the third cylinder to fire is "weaker" than the second (due for example to lower compression) so that the period $T_{c3}$ is longer than the period $T_{c1}$ or $T_{c2}$. Of course, if the engine is accelerating, then average speed will be rising with time, the line AVE will slope upwardly, and each of the periods $T_{c1}$ through $T_{c4}$ will be progressively shorter; but the instantaneous speed will still fluctuate in the general manner illustrated over the span of one cylinder firing, i.e., 90° of crankshaft rotation.

The fluctuations in instantaneous speed are called torsional variations or oscillations, because as each cylinder fires, torque and speed briefly rise and then fall relative to the average speed. It may be seen visually and intuitively from FIG. 2 that torsional speed fluctuations, if broken down by Fourier analysis, will have a strong fundamental sinusoidal component at the "firing frequency" and a relatively strong fourth sub-harmonic component at the crankshaft rotation frequency. Both such frequencies increase or decrease as average speed increases or decreases; it follows that the periods Tcr and $T_{c1} \ldots T_{c4}$ decrease or increase inversely as speed increases or decreases.

If one designates the crankshaft angular position by the symbol $\theta$, then instantaneous speed as represented by the curve 40 depicts $d\theta/dt$. Rotation of the crankshaft through a given small angle $\Delta\theta$ requires less time shortly after each firing instant FI than just prior to the next firing instant. Compare the time spans $\Delta t_1$ and $\Delta t_2$ labeled in FIG. 2 as occupied while the crankshaft turns through two respective equal angles of $\Delta\theta_1$. Therefore, the nominal frequencies $f_{22}$ and $f_{25}$ given by Eqs. (1) and (2) are not uniform when average speed is constant; they fluctuate with the same variations appearing in the curve 40. This makes clear the fact that if speed is sensed and numerically determined from the frequency of the pulses 22 or 25, or at intervals which are short in relation to the periods Tcr and $T_c$, then the effect of torsional variations will be strongly reflected in the successive numerical samples.

In the straightforward and common practice of employing a real time, programmed computer as the major component of a digital controller in a closed loop system, a control algorithm or program is entered and executed on a regularly timed basis. That is, the computer jumps into the program, takes in a sensed value of the controlled physical parameter (such as speed), and computes a fresh value of a final output signal which determines the parameter-influencing physical variable (such as rate of fuel input to an engine). In the conventional regularly timed technique, speed is determined by measuring the magnitude of $\Delta\theta$ and computing speed as represented by $\Delta\theta/\Delta t$ where $\Delta t$ is a constant. This is done every 16 ms., 10 ms. or 8 ms.—the rate of regular iterations being chosen by the designer and thereafter fixed. Generally speaking, it is desirable to make the uniform interrupt intervals as short as possible in order to reduce time lags. If the interval is long (16 ms. compared to 4 ms.), the response to any error in the controlled parameter is sluggish—for the reason that the external influences may cause the controlled parameter to change its value considerably in-between the instants when its value is sensed and determined for the purpose of making corrective adjustments.

Applicants have recognized, however, that the use of the regularly timed interrupt technique for controlling the speed of a multi-cylinder engine operating over a relatively low speed range (e.g., 20 to 500 r.p.m.) is doomed to one of two shortcomings. If the sampling and correction intervals are made short (the normally desired choice) as depicted by the spaced instants INST in FIG. 2, and if the gain response of the controller is made to be reasonably high, then the controller will "see" quasi-instantaneous values of sensed speed which differ greatly from the AVE crankshaft speed. The actuator 14 in that case will actually adjust the rack position—first in one direction and then in the other—during the time spans between cylinder firings. The rapid and continuous vibration of the actuator 14 and rack 12 would indeed wear them out after only a fraction of their intended useful operating life. On the other hand, if such vibrations of the actuator and rack are avoided by reducing the gain, or by spacing the sampling instants at greater intervals, then the system is slow and sluggish; transients for correction of speed errors created by load changes would be so long as to be unsatisfactory. In both cases, the phase of the sampling instants relative to the speed curve 40 would be unknown and continuously changing—so that false corrective motion of the rack position would occur.

In the novel speed sensing and governing system to be described, the regularly timed interrupt technique is not used, and its disadvantages are avoided. Instead, a sample of existing speed is numerically determined and signaled each time that the crankshaft has rotated through some predetermined angular displacement $\Delta\theta$, and the elapsed time is numerically signaled. Thus the value of speed S is found from determining the value of $\Delta\theta/\Delta t$ where $\Delta\theta$ is a known, constant value and $\Delta t$ is a measured value. And in conjunction with this approach, the digital controller iterates its corrective action, not at regularly timed instants, but at intervals t which become shorter or longer as average speed increases or decreases.

There are drawbacks if $\Delta\theta$ is chosen to be made small; and there are other drawbacks if $\Delta\theta$ is chosen to be made large. Such drawbacks are more severe when the engine (i) has a relatively small number of cylinders, and/or (ii) the engine is designed to operate and is operated over a relatively low range of speeds.

Marine diesel engines for driving variable pitch propellers are often of that character. Many marine engines have from two to six cylinders and are operated, for example, over a range on the order of 20 r.p.m. minimum (idle) to 100 r.p.m. maximum (top rated speed). Assuming that the engine 10 in FIG. 1 is a four-cylinder, two-cycle engine, then at a constant average speed of 20 r.p.m., the periods $T_c$ in FIG. 2 are nominally 750 ms. in duration; and at a constant average speed of 100 r.p.m. the periods $T_c$ are nominally 150 ms. in duration.

It is to be kept in mind also that if the engine is accelerating or decelerating, then each of the four successive time intervals $Te_{i-3}$, $Te_{i-2}$, $Te_{i-1}$ and $Te_i$ over the span of one crankshaft revolution will be prgressively shorter or longer. And as noted above, a "weak" or disabled cylinder easily may make one of those intervals longer than the others even under steady state conditions when the AVE speed is constant.

Consider the first of the two alternatives. If one chooses the ratio P/M in Eq. (3) and thus $\Delta\theta$ to be large (say, P/M=1 and $\Delta\theta=360°$) so that a fresh or updated value of Te is found once per shaft revolution, the numerical value for the duration Te is, in effect, "old" by the time it can be used and effective in determining the new fuel rate which should be created so as best to eliminate any speed error. If the engine has decelerated during the three quarters of a revolution, the duration Te corresponding to 360° of rotation will be shorter than it should be to reflect actual speed at the instant when a pulse 27 appears. It might be said that the sensed speed intelligence is "stale" and weighted falsely by the instantaneous speed values which existed 0.6 to 3.0 seconds earlier. In the parlance of closed loop control theory, a very large lag or phase loss is created when the pre-selected value of the angle $\Delta\theta$ is large.

Consider the second of the two alternatives. If one chooses the ratio P/M in Eq. (3) and $\Delta\theta$ to be small (say, P/M=1/30 and thus $\Delta\theta=12°$), then the length of each successive period Te in the pulse train 27 reflects the average of the instantaneous speed which has physically existed during the last rotation of $\Delta\theta$ (here, 12°)—and the successive pulses 27 occur more frequently (every 100 ms. at 20 r.p.m. or every 20.0 ms. at 100 r.p.m.). Thus, there is relatively little "lag"; each new waveform interval Te is "fresh" and accurate. And the processing of successive signals at intervals considerably shorter than 20 ms. is entirely feasible with currently available microcomputers.

The difficulty with making P/M and $\Delta\theta$ small, however, flows from the fact that each duration Te, which is inversely proportional to speed, represents average speed over the last small angular rotation (say 12°). The successive numerical values of the durations Te will jump or change widely in magnitude due to the torsional fluctuations in speed. This becomes apparent from FIG. 2; if one incremental angular rotation $\Delta\theta_1$ is taken near the peak of the varying instantaneous speed curve 40, the resulting duration $\Delta t_1$ will be quite short; but if another is taken at near a valley, the resulting duration $\Delta t_2$ will be relatively much longer. The numerical value of sensed speed will thus "jiggle" about the average speed as represented by successively determined values of the elapsed time Te. Again, this will cause rapid mechanical oscillation of an actuator which is attempting to correctively adjust engine fuel input rate, resulting in wear and short life. And if one or two cylinders are "weak" in relation to the others, the actuator will attempt a correction in fuel rack position after each weak cylinder fires, even though average speed is constant—thereby creating a cyclical error in successively signaled values of average speed.

To alleviate such difficulty, the common practice of the art has been to compute and use a running average of the several samples—that is, to take values of the last ten time periods $\Delta t_1$, sum them, and divide by ten. The reciprocal of the average $\Delta t_1$ is thus the average of the instantaneous speed over the last ten angular increments $\Delta\theta_1$. This creates a filtering effect but imposes the penalty of a phase or time lag which makes the control system sluggish. It also can create an erroneous average because more of the summed values may correspond to peak regions on the curve 40 than those corresponding to valley regions (or vice versa) so that the "computed average" of speed does not accurately represent the time average.

In accordance with the present invention, a multicylinder engine whose crankshaft exhibits torsional fluctuations in instantaneous speed is accurately governed in its average speed by (1) sensing means which repeatedly determine value of the elapsed time Tcr during which the crankshaft rotates through one whole revolution (360°), and (2) means for producing a fresh value of Tcr Q times per crankshaft revolution, where Q is an integer greater than 1.

As will become apparent later, this produces the advantage that the torsional speed fluctuations simply cannot be seen and are not reflected in the successively signaled values of Tcr. The actuator 14 and the rack 12 do not mechanically vibrate at the torsional fluctuation frequency, and thus do not unduly wear. Yet, because a fresh value of Tcr is determined Q times per revolution and at time intervals shorter than the period Tcr, the latest value of Tcr (and its reciprocal S) is not "stale"; the phase lag of sensing speed and correcting fuel rate is reduced by a factor of 1/Q in comparison to the lag experienced if Tcr and S were freshly determined once per revolution.

For achieving these results, a first signal (e.g., one of the pulses 27) is produced at each instant when the crankshaft 10a has rotated through predetermined successive angular displacements $\theta_1, \theta_2, \theta_3 \ldots \theta_q$ where Q is a chosen integer greater than 1, and where $$\sum_{1}^{q} \Delta\theta = 360° = \text{one revolution} \quad (4)$$

The symbols Q and q are used interchangeably for the same integer. Eq. (4) may perhaps be better understood in its alternative form:

$$\Delta\theta_1 + \Delta\theta_2 \ldots + \Delta\theta_q = 360° \quad (4a)$$

The requirement is simply that one full revolution of the crankshaft be divided into Q angles (which need not necessarily be equal to one another) and that the first signals which appear at the end of displacement through any particular angle $\Delta\theta_x$ have time spacing equal to the period Tcr during which the crankshaft turns one whole revolution.

As one example, consider that Q is preselected as 3 and $\Delta\theta_1$, $\Delta\theta_2$ and $\Delta\theta_3$ are preselected as 110°, 130° and 120° respectively. To effect this, the apparatus of FIG. 1 would be modified to omit the counter 22 and to employ a wheel 20 with only three teeth spaced apart by 110°, 130° and 120° so that the output of the MPU 21 would be fed to the differentiator 26 to create three of the pulses 27 per crankshaft revolution. Pulses 27 generated by a given one of those teeth will be spaced in time by the interval Tcr. But all of the pulses 27 will form a stream in which the time intervals between successive pulses 27 are inversely proportional to the average speed as the crankshaft turns through successive angles of 110°, 130° and 120°.

In the preferred practice of the invention, the predetermined successive angular displacements $\Delta\theta_1 \ldots \Delta\theta_q$ are all equal to one another, such that $$\Delta\theta_1 = \Delta\theta_2 = \Delta\theta_3 \ldots = \Delta\theta_q = 360°/Q \quad (5)$$

And although not essential, it is preferred that Q be preselected as an integral submultiple of 360, so that it is convenient to pick values of M and P (if the counter 22 is employed) which make the ratio M/P equal to the selected value of Q. When all the angular displacements $\Delta\theta_1 \ldots \Delta\theta_q$ are equal, then the pulses 27 will be spaced by essentially equal time intervals—see the intervals $Te_{i-3}$ through $Te_i$ in FIG. 2—and interrupts to the microprocessor 30 (FIG. 1) will take place at an essentially uniform rate (but which increases or decreases as average speed becomes greater or less). For example, if Q is 3, then the three successive $\Delta\theta$'s will be made 120°, if Q is 4, the three successive $\Delta\theta$'s will be made 90°, and so on. For the example represented in FIGS. 1, 2 and 4, the preselected value of Q is 4 and the four $\Delta\theta$'s are each 90°.

With toothed wheel 20 and the counter 24 shown in FIG. 1—and assuming that the number M of equally spaced teeth on the wheel 20 is an integral multiple of the counter division factor P, then the choice of M and P determines the value of Q applicable to the pulses 27. That is, $$Q = M/P \quad (6)$$

As a specific example, if M is 256 and P is 64, then Q will be 4 and one of the pulses 27 will appear at the end of each time interval during which the crankshaft has turned through each successive $\theta$ displacement of 90°. It will be apparent, however, that the same result may be obtained by constructing the wheel 20 with simply four teeth spaced at 90° around the periphery, omitting the counter 24, and using the MPU output pulses as the "first signal" in lieu of the pulses 27. In this latter case, M is 4, P is 1 and Q is 4.

In any case, and in accordance with Eqs. (4) and (4a), it will be seen that the time interval between the appearance of a given first signal ($FS_i$) (e.g., a pulse 27) and the Qth preceding first signal ($FS_{i-q}$) is the time Tcr elapsing while the crankshaft has rotated one whole revolution. The elapsed time Te between successive pulses 27 depends upon the $\Delta\theta$ angles; and in the preferred arrangement (where $\Delta\theta_1$, $\Delta\theta_2$ ... $\Delta\theta_q$ are all equal) corresponds to the elapsed time Te during which the crankshaft has rotated through 360°/Q.

Further in accordance with the invention, a digital signal Tcr is produced, each time the first signal appears, to numerically represent the elapsed time between the current appearance of the first signal and the appearance of the Qth preceding first signal. See the elapsed times $Te_{i-3}$, $Te_{i-2}$, $Te_{i-1}$, $Te_i$ in FIG. 2 which end at the instants $t_{i-3}$, $t_{i-2}$, $t_{i-1}$, $t_i$ when the successive pulses 27 appear. At the instant $t_i$, a signal $Tcr_i$ is produced to numerically represent the time for one revolution, which is that interval indicated by the Tcr dimension line at the top of FIG. 2. At the instant $t_{i-1}$ a signal $Tcr_{i-1}$ will have been produced to numerically represent the time span between instant $t_{i-1}$ and instant $t_{i-5}$ (the latter not being shown in FIG. 2). But it will now be understood that at intervals Te a fresh number Tcr is produced to represent the numerical value of time which is, in effect, the sum of the Q preceding time intervals Te (recall that for the case of FIG. 2, Q=4 and all $\Delta\theta$'s are 90°).

It is to be noticed from FIG. 2 that—no matter what the nature or shape of the torsional fluctuations in speed, or indeed if the shape and magnitude of the torsional fluctuations produced by the respective cylinders differ from one another—the numerical value of the signal Tcr will be inversely proportional to average speed over one whole revolution. If average speed is constant (i.e., under steady state conditions) the successive values of Tcr will be equal. But if the engine starts to accelerate (assume that load torque is suddenly lowered) just after the interval $Te_{i-2}$, then the periods $Te_{i-1}$ and $Te_i$ will be shorter than illustrated—and this will result in the labeled time interval Tcr being shorter, the numerical value $Tcr_i$ being lower than first explained and thus reflecting the fact that acceleration has started. If crankshaft average speed starts to change (or is changing) from an original value, no more time than one Te interval passes before the next update of the Tcr value reflects, at least in part, that change. Thus, the time delays or lags of a "one sample per revolution" procedure are alleviated.

As a matter of arithmetic procedure, assume that there is a continuously running precision digital clock whose output continuously changes to represent the current time. At each of the instants $t_i$, $t_{i-1}$ ..., the clock is "read" to capture the then-existing numerical value of time. The number thus captured will be designated herein by the symbol CLOCK. Now to obtain a numerical value of Tcr at each instant t, a subtraction may be performed:

$$Tcr_i = CLOCK_i - CLOCK_{i-4} \quad (7)$$

and the value $Tcr_i$ will numerically represent the labeled dimension for Tcr at the top of FIG. 2. The same result may be obtained by signaling the numerical values of elapsed time between the successive instants t, and summing them. That is, $$Tcr_i = Te_i + Te_{i-1} + Te_{i-2} + Te_{i-3} \quad (8)$$

$$Tcr_i = (CLOCK_i - CLOCK_{i-1}) + (CLOCK_{i-1} - CLOCK_{i-2}) + (CLOCK_{i-2} - CLOCK_{i-3}) + (CLOCK_{i-3} - CLOCK_{i-4}) \quad (9)$$

In the example of FIG. 2, Q is 4 and $\Delta\theta$ is 90°. But to express the generic or general case, Eq. (7) may be expressed:

$$Tcr_i = CLOCK_i - CLOCK_{i-q} \quad (10)$$

and the magnitude of or equality of the predetermined successive $\Delta\theta$'s is of no significance. A general case expression for Eq. (9) becomes $$Tcr_i = (CLOCK_i - CLOCK_{i-1}) + \ldots + (CLOCK_{i-q-1} - CLOCK_{i-q}) \quad (11)$$

In every case, when a value of Tcr is obtained, the shaft speed S may be found numerically as a reciprocal, viz.

$$S_i = 1/Tcr_i \quad (12)$$

As one example and preferred embodiment of apparatus for carrying out this procedure to obtain periodically updated values of Tcr and sensed engine speed S, the microcomputer 16 is associated with an external counter 45 continuously driven by input pulses from a precision crystal pulse oscillator 46. The binary number signaled by the counter may be taken into the microcomputer via PORT 1 simply by addressing that port as if it were a word of memory. The counter 45 is preferably "wide", e.g. 32 bits wide, so it runs up to a large numerical content before each rollover. If necessary when the microprocessor 30 and the data bus are 8 bits wide, the counter number may be applied in bytes to three separate eight bit ports which comprise PORT 1 and which are read separately for arithmetic processing. It will be assumed for simplicity that the microprocessor and the data bus are 32 bits wide and that provisions (not shown) are made to be certain that the counter has "settled" before its contents are read. Of course, in some microcomputers with adequate capability, the counter 45 may be embodied as a word of memory continuously incremented from the microcomputer's internal oscillator.

The program memory 32 is loaded with a program of instructions which cause repeated or iterated executions of an algorithm that (i) creates and updates a binary word signal S which represents the latest sensed value for actual speed, and (ii) determines and outputs a signal F used to energize the actuator 14, thereby to determine the position of the fuel rack 12 and the rate of fuel fed to the engine 10. This latter portion of the program produces a proportional, integral, derivative (PID) response to any error existing between the set point speed value $S_d$ and the sensed actual speed S. The entire program will be understood from the flow chart in FIG. 4 and the descriptions of it which follow.

Certain "words" which represent changeable numerical values are assigned to particular address locations in the data memory 34. For ease of discussion, these words have been assigned symbols which are shown in FIG. 3 as a partial "map" of the memory 34. It will be understood that by its execution of successive instructions stored in the program memory 32, the microprocessor can "read" any data word from memory, perform some arithmetic operation on that numerical word taken with another as an operand, and then "write" the result back to the same or a different location in memory. The multibit ports are "readable" or "writable" as if they were words of the data memory.

Figure 4:
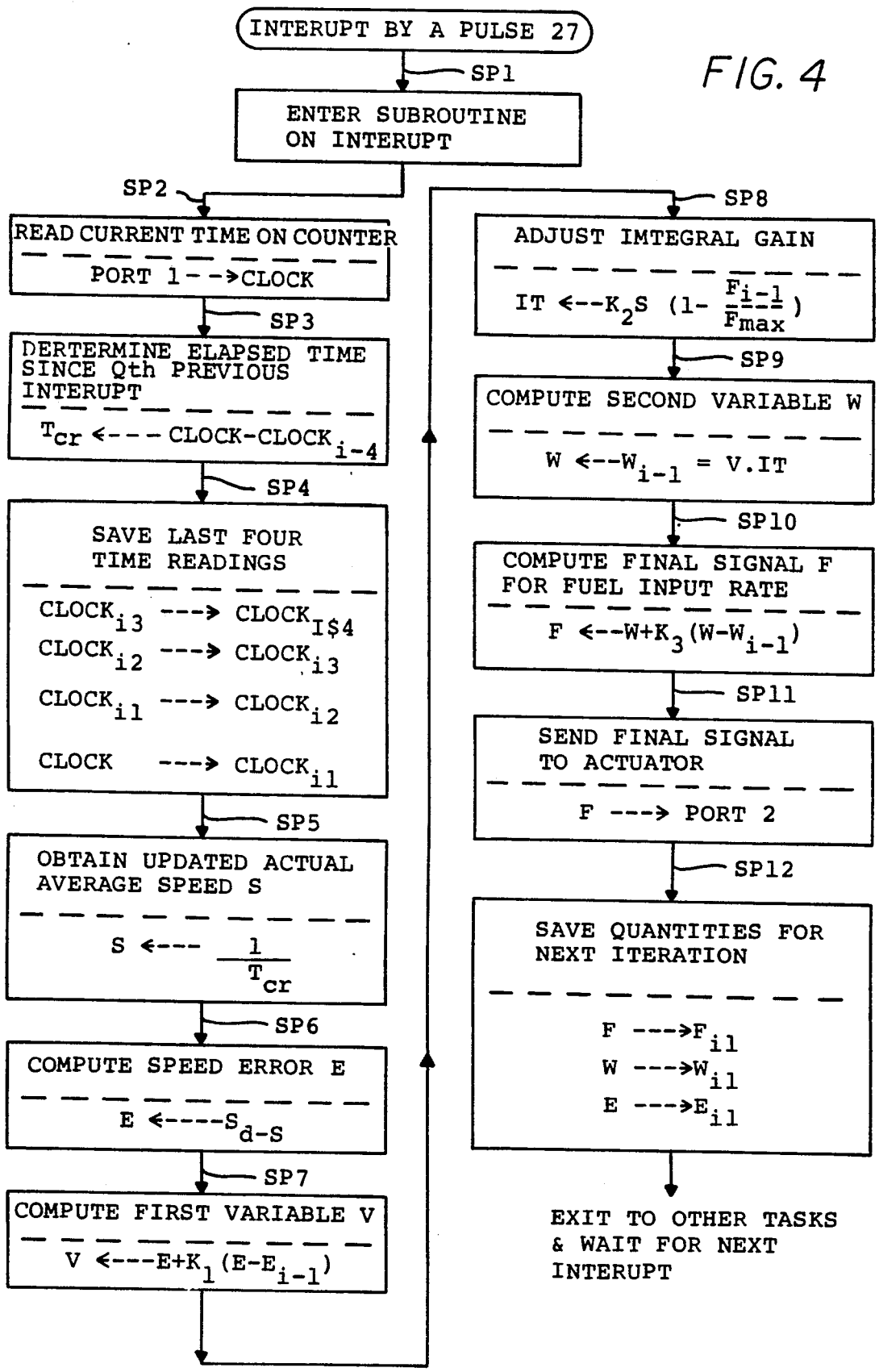
FIG. 4 is a flow chart which illustrates the details of a speed sensing and governing program subroutine loaded into the program memory of the digital computer to participate in the method and apparatus of the invention according to an exemplary and preferred embodiment.

Turning first to the matter of signaling actual speed S and recalling that the successive pulses 27 are applied to the interrupt terminal INT, the microcomputer jumps into the sub-routine of FIG. 4 each time one of those pulses (which are separated by elapsed time Te, FIG. 2) appears. This is illustrated at step SP1 in FIG. 4 and is followed by step SP2 where the running number signaled from counter 45 (and which is like the output of a digital time clock) is taken in via PORT 1 and stored at the CLOCK data memory address. Thus the CLOCK signal represents the latest value of time at essentially the instant $t_i$ of the last-appearing pulse 27. There are held at different memory addresses the signals CLOCK$_{i-1}$, CLOCK$_{i-2}$, CLOCK$_{i-3}$, CLOCK$_{i-4}$ which were taken in from counter 45 during step SP2 of the four previous passes through the sub-routine and "saved". Therefore, the actual duration of the elapsed time Tcr, between the latest pulse 27 (at instant $t_i$) and the fourth one preceding it, is computed in step SP3 by the subtractive operation:

$$Tcr = CLOCK - CLOCK_{i-4} \quad (13)$$

This subtraction is preferably carried out in the known fashion of two's complement binary arithmetic so that an accurate answer is obtained even if there has been a "rollover" in the counter 45 between one reading at instant $t_{i-4}$ and the later reading at instant $t_i$.

The signal Tcr found and stored at step SP3 represents numerically the time elapsed during the most recent whole revolution of the crankshaft and during an interval which ended at the instant when the last-received pulse 27 appeared. The memory words CLOCK$_{i-1}$, CLOCK$_{i-2}$, CLOCK$_{i-3}$, CLOCK$_{i-4}$ before step SP4 is reached contain the corresponding numerical values signaled by the counter 45 at step SP2 of the previous, the second-previous, third-previous and fourth-previous passes through the program. Thus, when step SP4 is executed, these contents are all "moved up" one step (the oldest of the four numbers is washed out) by transfers, and the latest value of CLOCK is transferred into memory location CLOCK$_{i-1}$. To say this another way, after the four transfers of step SP4 are complete:

CLOCK$_{i-4}$ contains the subtrahend for the next pass execution of step SP3.

CLOCK$_{i-3}$ contains the subtrahend for the second next pass execution of step SP3;

CLOCK$_{i-2}$ contains the subtrahend for the third next pass execution of step SP3;

CLOCK$_{i-1}$ contains the subtrahend for the fourth (the Qth) next pass execution of step SP3.

At step SP5, the computer carries out the computation designated in Eq. (12). The reciprocal of Tcr is computed to produce and store a signal S—which will be used as the actual speed of the engine during the remainder of the present pass through the rest of the governor system program.

A unique and advantageous aspect of the present invention resides in the fact that a fresh value of Tcr (the time interval for shaft rotation through one whole revolution) is computed during each program iteration to represent the sum of the last four preceding elapsed times $Te_{i-3}$ through $Te_i$ (see FIG. 2). The program is repeated (iterated) at successive instants when the interrupt pulses 27 appear, so that the computed numerical value of Tcr on any pass is entirely immune from and independent of torsional speed fluctuations at the cylinder firing frequency or, indeed, torsional fluctuations at the crankshaft rotation frequency. The value of S computed as the reciprocal of the Tcr found during one iteration represents the average of the instantaneous speed existing between individual ones of the last Q interrupts and thus over one whole revolution of the crankshaft. Therefore, if the engine is accelerating or decelerating, the computed value of Tcr on successive passes will decrease or increase and the time spacing between passes will likewise decrease or increase. When steady state speed is relatively higher or lower (e.g., at 100 or 20 r.p.m.) the computed value of Tcr and the iteration rate will be lower or higher. The iteration rate is tied directly to the one revolution rate by the chosen value for the constant Q. Specifically, these will be Q interrupts and Q iterations through the FIG. 4 subroutine per crankshaft revolution, and thus the time span between one iteration and the next will be equal to the elapsed time Te between two of the pulses 27. In the preferred embodiment, however, the individual angles $\Delta\theta$ are all equal [see Eq. (5)] and the elapsed times $Te_{i-3}$ through $Te_i$ (FIG. 2) will nominally be of essentially equal duration. Thus, while interrupts for entry into the FIG. 4 subroutine occur at instants $t_{i-4} \ldots t_i$, it is sufficiently accurate, as a quantitive measure of time between interrupts, to assume that the interrupts are spaced equally and by intervals which are 1/Qth of the revolution time Tcr. That is, one may say that, in effect, the "sampling time" T between successive passes through the subroutine of FIG. 4 is:

$$T = Tcr/Q = Tcr/4 \quad (13a)$$

where Q is 4 for the example of FIG. 2. Thus, once the value of Tcr is known, one knows the nominal and effective numerical value (which is variable) for the time T between successive iterations. If average speed is 100 r.p.m., then Tcr will be 0.600 seconds per revolution and T will be $0.6/Q = 0.6/4 = 0.150$ seconds. But if average speed is 20 r.p.m., then Tcr will be 3.0 sec. and T will be $3/Q = \frac{3}{4} = 0.750$ seconds. What this means is that when engine speed S is higher and can change more rapidly, the updating of the sensed speed S occurs more frequently; therefore changes in sensed speed are seen (reflected in the number S) more promptly.

Before turning to the closed loop speed governing action created in the present system, it should be noted that the speed-load characteristics of different engines driving different load devices may differ widely. The load may impose a value of torque which changes with speed; and the load device may itself be changed in its nature so that load torque is different even at a given, constant average speed.

FIG. 5 is a specific example which characterizes the load-speed relations of a particular engine driving a particular load, viz., a certain four cylinder diesel engine driving a variable pitch marine propeller. If the propeller pitch is set to minimum and essentially zero, then the torque required to maintain steady state speed at any value within the range from 20% to 100% of top, rated engine speed will follow the curve 50. On the other hand, if the propeller pitch is set to maximum, then the torque at any steady state speed will be represented by the curve 51. Both curves are non-linear, but in general (for a given pitch setting) torque increases as the square of the steady state speed. At pitch settings between minimum and maximum, different ones of a whole family of curves (typified at 52 and 53) become applicable, with the spacings of such curves being non-linear. At any given steady-state speed, the load torque presented by the propeller will increase essentially as the third power of propeller pitch.

Although load torque depends upon the condition (pitch setting) of the load device and also upon speed, it is a reasonable approximation to say that engine output torque (and thus load torque) is proportional to the rate of fuel input to the engine under any set of circumstances. Therefore the position or displacement of the rack 12 from its idle location, and thus value of the digital signal F may be used as representing the load torque.

When a given engine coupled to a given load device is first associated with a given closed loop controller or speed governor, the transfer functions and time lags in the engine and load device are not known. If error correcting action is to be obtained by PID responses of the controller to speed errors, the "gain factors" and time constants for the proportional, integral and derivative effects—to provide optimally quick response but without hunting or instability—are also unknown. There is the further inescapable fact that the transfer function and time lags of the engine and load device change as the operating point moves to different locations within the region bounded by the curves 50 and 51 in FIG. 5. As the operating point shifts (because the speed set point and/or propeller pitch are changed) then the gain factors and time constants for and within the PID controller should be changed in order to prevent instability and keep at least an approximately optimum response. This has prompted the art of closed loop controls to propose and actually use various types of elaborate and complex "adaptive" systems which automatically "tune" the gains and time constants of a PID controller as the engine and load characteristics vary.

In accordance with the present invention, a PID speed governing controller is created by and within the microcomputer to provide open loop adaptive adjustment or approximated re-tuning of gains and time constants—the computer program being amazingly short, simple and consuming very little computer time for each iteration. This speed governing program cooperates particularly with the method and apparatus already described for iteratively obtaining the speed-representing signal S at step SP5 in FIG. 4, and is characterized by the fact that iterations of the governing program are repeated—not at a constant or clocked (regularly timed interrupts) rate, which has been the standard practice in prior art—but instead at a rate which varies inversely with changes in engine speed. In other words, the iteration frequency of the program routine is increased or decreased as the controlled speed increases or decreases.

When any given engine coupled to any given load device is first hooked up to the other components which comprise the control system as shown in FIG. 1, three significant numerical values are immediately known.

First, the top rated speed (here called $S_R$) above which the engine should not be operated (except for minor transient excursions) is known from the engine manufacturer's specifications or from some top limit imposed by the nature of the load device. For example, in a certain marine propulsion application, the top rated speed $S_R$ might be 100 r.p.m. and that value will be assumed for purposes of discussion. To give a further concrete example to aid understanding, it may be assumed that the toothed wheel 20 has 600 teeth and the counter 24 (FIG. 1) divides by 150, so from Eqs. (6) and (5)

$$\frac{M}{P} = Q = \frac{600}{150} = 4 \quad (13b)$$

$$\text{and } \Delta\theta_1 = \Delta\theta_2 = \Delta\theta_3 = \Delta\theta_4 = \frac{360°}{Q} = 90°$$

The general symbol $\Delta\theta$ will be used for the 90° angle in discussing the example of FIG. 4.

It will be useful to express S and $S_R$ in units of rev. per sec. rather than in units of r.p.m.—since it will be apparent from steps SP1 through SP6 in FIG. 4 that the elapsed time Tcr (step SP3) is the time for the crankshaft to rotate through one revolution and the speed S is in units of revolutions per second. Of course, other units and scaling factors may be adopted as a matter of choice. But in the present example, if top rated speed is 100 r.p.m., top rated speed is known from:

$$S_R = 100/60 = 1.666 \text{ rev./sec.} \quad (13c)$$

Since $S_R$ is known, then the idealized value of the elapsed time Te (required for rotation through $\Delta\theta$, here 90°) is also known. Thus the nominal time period between successive pulses 27 and the intervals between successive interrupts at top rated speed may be designated by the symbol $T_R$ and is known from $$T_R = \frac{1}{S_R Q} = \frac{1}{1.666 \cdot 4} = 0.150 \text{ sec.} \quad (14)$$

Eq. (14) is simply a specific case of Eq. (13) when top rated speed and S is equal to 1.666 rev. per sec.

The third known numerical value is the maximum possible rate of fuel input, over and above the fuel input rate for idle speed which is assumed in FIG. 5 to be 20% of top rated speed. The maximum fuel rate may be thought of as represented, with appropriate scaling factors, as the maximum fuel position of the rack 12 (measured from the idling position) in FIG. 1 and thus the maximum effective value of the digital signal F. This value $F_{max}$ is numerically known from the characteristics of the DAC 15 and the actuator 14; it is the value of F which results in the rack 12 being positioned for maximum fuel input rate. The known value $F_{max}$ is in general proportional to maximum engine torque.

When a given engine coupled to a given load device is first hooked up to the remaining control system components of FIG. 1, the engine may be started up and manually controlled to operate at a selected reference point within the region bounded by curves 50 and 51 in FIG. 5. For example, the load device is adjusted for minimum torque load (minimum or zero pitch in the case of a propeller) and the engine is operated at top speed $S_R$. The engine/load will then be operating at the reference point RP in FIG. 5 with minimum load and top speed. In these circumstances, S will be equal to $S_R$ and T (the intervals between interrupts) will be equal to $T_R$. Now, the engine is subjected to speed and/or load transients and the gains and time constants for integral, proportional and derivative action are "tuned" to provide near-optimum response, namely, stability and shortest transient recovery time. This is a known technique for "tuning", with a change in one factor affecting other operating responses so that a best compromise is achieved by a cut-and-try procedure. But this will result in the finding and storing of values for constants $I_R$, $B_R$ and $D_R$ which are a "best fit" for integral, proportional and derivative action when the engine and load device exhibit their inherent transfer functions and lags at the reference point RP. The significance of these reference values $I_R$, $B_R$ and $D_R$ will be better understood from the description which follows, but it may be understood that—by keying in through the keyboard 18—these numerical values are stored as constants in corresponding words of the data memory 34 (see FIG. 3 where the constant words of memory are distinguished by small rectangular enclosures).

The known numerical values for $S_R$, $T_R$ and $F_{max}$ are also entered into the corresponding words of memory. Thus, after initial set-up and tuning at the reference point RP, there are six constants stored and available in the microcomputer memory. They are $S_R$, $T_R$, $F_{max}$, $I_R$, $B_R$ and $D_R$.

Prior to describing the speed governing program which is loaded into the instruction memory 32, it will be helpful to understand the underlying rationale of a proportional, integral, derivative controller. The PID response to any existing error between the actual, sensed value of speed and the set point or desired speed may be expressed $$F = I/s \, (Bs+1) \, (Ds+1) \, (S_d - S) \quad (15)$$

where
- $S_d$ is the desired or set point speed;
- S is the actual speed;
- I is the integral action gain;
- B is a time constant for lag-lead action, and called the "stability" factor;
- D is a time constant for lag-lead action, and called the "compensation" factor;
- F is the output signal which determines rate of input medium (fuel) which produces the speed S; and
- s is the conventional "differential operator" commonly employed in differential equations.

It will be understood that the symbol s is an equivalent for a derivative d/dt. Mathematically, the reciprocal 1/s stands for an integration function.

To see readily that Equation (15) provides for proportional, integral and derivative responses to any speed error, it may be noted that the right factor in that equation is indeed the speed error E. That is, $$E = S_d - S \quad (16)$$

Putting this into Eq. (15) and expanding by algebraic manipulation:

$$F = \frac{I}{s} [s(B + D) + s^2 BD + 1] \cdot E \quad (17)$$

$$F = I \left[ (B + D) + sBD + \frac{1}{s} \right] \cdot E \quad (18)$$

-continued
$$F = I(B + D) \cdot E + I \int E dt + IBD \cdot \frac{dE}{dt} \quad (19)$$

One readily sees that the first term in Eq. (19) is "proportional" to the error E with a gain factor of I(B+D); the second term varies as the integral of the error E with a gain factor of I; and the third term varies as the derivative of the error E with a gain factor of IBD.

Equation (15) is in analog form; that is, it contemplates variables which can change continuously and with infinitely small steps as time passes. This may be converted to an expression which is executed at instants spaced by finite time intervals T in an iteration procedure capable of being carried out in a digital computer. Such conversion is found by substituting for the differential operator s the iteration procedure equivalent:

$$s = \frac{1 - z^{-1}}{T} \quad (20)$$

where T is the time spacing between iterations and the symbol $z^{-1}$ represents "previous value". If a repeatedly updated variable is conventionally represented as $U_{i-1}$, $U_i$, $U_{i+1} \ldots U_{i+n}$, the same notation may be expressed $Uz^{-1}$, $Uz$, $Uz^2$, $Uz^3 \ldots Uz^n$.

Substituting from Eq. (20) into Eq. (15) yields:

$$F = \quad (21)$$

$$\frac{IT}{1 - z^{-1}} \left[ \frac{B}{T} (1 - z^{-1}) + 1 \right] \left[ \frac{D}{T} (1 - z^{-1}) + 1 \right] (S_d - S)$$

In the latter expression, the quantity T is usually a constant; but in the practice of the invention it is indeed a variable, as explained above. It is the "time per $\Delta\theta$" and is sufficiently approximated by Eq. (13a); moreover, it is related to speed S (in rev. per sec.) as set out in Eq. (14).

In Eq. (21) the integral gain is still constituted by the quantity I, the "stability factor" is still constituted by the quantity B, and the "compensation factor" is still constituted by the quantity D. These are normally thought of as constants; the first does indeed influence integral action gain while all three influence both proportional and derivative action gain (hence the need for compromise "tuning"). But I, B and D are the quantities that affect and determine the "matching" of the controller to the transfer function and lags of the controlled entity (here the engine and load device). And, as noted above, those latter characteristics of the controlled entity change as the system moves from one operating point to another in the region between curves 50 and 51 in FIG. 5.

As a general approximation to "track" changes in transfer function and lags of the controlled engine and load device, the integral gain value I should increase as the square of operating speed S and should increase almost linearly with load torque. In other words, as speed and load take on different values from time to time, the value of the quantity $I_i$ at any time should be related to a known starting value $I_R$ such that $$I_i = I_R \left( \frac{S_i}{S_R} \right)^2 \left( \frac{L_i}{L_{max}} \right) \quad (22)$$

where $L_i$ represents current value of load torque. But with the assumption that $F_i$ is an indicator of load torque, then the influence of changing torque can be expressed by rewriting Eq. (22) in the form:

$$I_i = I_R \left( \frac{S_i}{S_R} \right)^2 \left( 1 + \frac{F_{i-1}}{F_{max}} \right) \quad (23)$$

where $F_{i-1}$ is the last available value of the output signal F and $F_{max}$ is the known constant value described above. It will be seen that the quantity is parentheses changes from 1.0 to 2.0 as the output signal $F_{i-1}$ changes from zero to $F_{max}$. Thus, the quantity $I_i$ is in essence increased linearly as load torque increases from its to its maximum value.

The quantity $$\left( \frac{S_i}{S_R} \right)^2$$

is the square of the normalized speed. If speed can lie between 20 and 100 percent of maximum speed, then that quantity will increase from 0.04 to 1.0 as speed increases from, say, a minimum of 20 r.p.m. to a top rated value of 100 r.p.m.

Consider next that Eq. (21) requires and utilizes the two factor expression IT. Eq. (23) may be converted into such an expression by multiplying both sides by T:

$$(IT)_i = \frac{I_R S_i^2 T_i}{S_R^2} \left( 1 + \frac{F_{i-1}}{F_{max}} \right) \quad (24)$$

But it is self-apparent that because S and T vary inversely, their product is a constant. Indeed:

$$S_i T_i = S_R T_R = 1/Q \quad (25)$$

where $S_R$ and $T_R$ are known constants, the former being viewed in units of rev./sec. and the latter being viewed in units of "sec. per $\Delta\theta$" where successive $\Delta\theta$'s are equal or approximately equal. Substituting $T_i$ from Eq. (25) into the right side of Eq. (24) yields:

$$(IT)_i = \frac{I_R T_R}{S_R} S_i \left( 1 + \frac{F_{i-1}}{F_{max}} \right) \quad (26)$$

Equation (26) contains only two variable $S_i$ and $F_{i-1}$; it is an expression that can be used for IT in Eq. (21) with the result that the effective value of I will automatically change as the square of speed and essentially linearly with load. The quantity within the parentheses of Eq. (26) may be viewed as a load factor LOAD FAC which compensates for changes in load torque imposed by the load device 11; this compensation factor may take specific forms which differ from the specific example given but which vary linearly with changes in load torque.

The stability factor B in Eq. (21) is desirably to be changed in its effective value such that it linearly decreases as speed increases. Starting with an inverse function which is not strictly linear, one may see that the stability B should decrease as the engine speed S increases, or $$B_i = \frac{B_R}{S/S_R} \quad (27)$$

If, for example, $S_R$ is 100 r.p.m. (1.666 rev. per sec.) and the minimum or idle speed is 20% or 20 r.p.m., the denominator may vary from 0.2 to 1.0 as speed increases, and $B_i$ will vary from $5B_R$ to $1B_R$ as speed increases from 20 to 100 r.p.m.. Thus the variation will be approximately a linear inverse relation over the span involved.

It is to be noted that Eq. (21) requires and uses the ratio B/T. Eq. (27) may be converted into such an expression by dividing both sides by T:

$$\frac{B_i}{T_i} = \frac{B_R S_R}{S_i T_i} \quad (28)$$

By substitution of $S_i T_i$ from Eq. (25) this becomes:

$$\left(\frac{B}{T}\right)_i = \frac{B_R S_R}{S_R T_R} = \frac{B_R}{T_R} \quad (29)$$

Surprisingly, the result $B_R/T_R$ is a constant, since $B_R$ and $T_R$ are both known constants. And this means that if the constant $B_R/T_R$ is used in lieu of in Eq. (21)—where T is a variable—the result will be the same as if the effective value of B were being changed such that it essentially linearly decreases as speed increases and T decreases.

The compensation factor D in Eq. 21 is also desirably to be changed in its effective value such that it linearly decreases as speed increases. By the train of reasoning set out above with respect to the factor B, this may be expressed $$D_i = \frac{D_R}{S/S_R} \quad (30)$$

and converted into an expression for the ratio D/T which appears in Eq. (21). That is $$\frac{D_i}{T_i} = \frac{D_R S_R}{S_i T_i} \quad (31)$$

Substituting $S_i T_i$ from Eq. (25) leads to $$\left(\frac{D}{T}\right)_i = \frac{D_R S_R}{S_R T_R} = \frac{D_R}{T_R} \quad (32)$$

Here again it is surprising to see that the ratio $D_R/T_R$ is a constant. And it becomes clear that if this constant is used for D/T in Eq. (21) the result will be that the effective value of D will decrease essentially linearly as speed increases.

Therefore, to execute Eq. (21) in a fashion such that (i) the effective integral gain I increases as the square of operating speed S and also linearly with load, (ii) the effective stability factor B decreases essentially linearly as speed increases, and (iii) the effective compensation factor D also decreases linearly as speed increases, substitutions may be made from Eqs. (26), (29) and (32) into Eq. (21) to arrive at:

$$F = \frac{\frac{I_R T_R}{S_R}\left(1 - \frac{F_{i-1}}{F_{max}}\right)S}{1 - z^{-1}}\left[\frac{B_R}{T_R}(1 - z^{-1}) + 1\right]\left[\frac{D_R}{T_R}(1 - z^{-1}) + 1\right](S_d - S) \quad (33)$$

Based upon the reasonable assumption that the iteration intervals T are equal to Tcr/Q as an approximation, then this final Equation (33) is seen to be independent of T—which appears in Eq. (21)—because the changeable values of T are merged into and are accounted for by the changing values of S and the previously determined constant values for $S_R$, $T_R$, $I_R$, $B_R$ and $D_R$.

The repetitive solving of Eq. (33) to arrive at a repeatedly updated value for the fuel rate signal F may be carried out in a digital computer by breaking the operations down into a chained sequence involving successive simple computations. This will be expressed by the conventional notation where the subscript i denotes "this iteration" and the subscript i−1 denotes the "previous iteration". With that as a preface, Eq. (33) is characterized by five expressions, as follows:

$$E_i = S_{di} - S_i \quad (34)$$

$$V_i = E_i + K_1(E_i - E_{i-1}) \quad (35)$$

$$(IT)_i = K_2 S_i \left(1 - \frac{F_{i-1}}{F_{max}}\right) \quad (36)$$

$$W_i = W_{i-1} + V_i(IT)_i \quad (37)$$

$$F_i = W_i + K_3(W_i - W_{i-1}) = W_i + K_3 V_i(IT)_i \quad (38)$$

where V and W are simply intermediate values used for convenience and $K_1$, $K_2$ and $K_3$ are composite constants determined from other known constants such that $$K_1 = \frac{B_R}{T_R} \quad (39)$$

$$K_2 = \frac{I_R T_R}{S_R} \quad (40)$$

$$K_3 = \frac{D_R}{T_R} \quad (41)$$

Before describing the speed governing instruction program in detail, one portion of a keyboard servicing subroutine will be treated with reference to FIG. 6. Whenever a given installation is being set up, the appropriate values of several constants are found and entered into the data memory (partially mapped in FIG. 3) of the microcomputer. The keyboard servicing subroutine is entered on timed interrupts (but during intervals when the sub-routine of FIG. 4 is not being executed). At step STP1, the computer determines if the set-up mode has been called (for example by keying in the letters SU). If so, the computer then waits for a receives the appropriate prefix codes and numerical digits—each value being stored at the appropriate memory location $S_R$, $T_R$, $I_R$, $B_R$, $D_R$ and $F_{max}$ (see FIG. 3). The values of $S_R$, $T_R$ and $F_{max}$ are known from the characteristics of the hardware components in FIG. 1, as previously explained. The values of $I_R$, $B_R$ and $D_R$ are found by a "best fit" compromise adjustment with the engine operating at rated top speed $S_R$ and minimum load (reference point RP in FIG. 5), and then subjected to speed and load transients—also as previously explained. The values of $I_R$, $B_R$ and $D_R$ as so found are thus stored in the corresponding words of memory at step STP2.

At step STP3, the convenience constants are freshly computed according to Eqs. (39) through (41) and stored at locations $K_1$, $K_2$, $K_3$.

The speed set point value $S_d$ may also be entered or changed at any time by way of the keyboard service subroutine. As indicated in FIG. 6, if the set-up mode is not called, the program proceeds from step STP1 to step STP4 to detect if a new set point prefix is being entered. If so, the fresh numerical value is, by step STP5, entered into memory location $S_d$; if not, the system simply exits from the subroutine.

Thus, the constant (but adjustable) values in the memory words (distinguished by rectangles in FIG. 3) are found, entered and made available prior to regular functioning of the speed governing system.

Because the present invention is not concerned with the particular conditions under which the engine 10 is initially started and brought up to idling or some other initial speed, the program flow chart in FIG. 4 does not include any of the special program operations which may be used for initial engine starting. It is assumed that the engine is running and the load device exists in a given condition (propeller pitch setting) and that the computer 16 is operating on a continuous basis with the words (among others) of data memory available as mapped in FIG. 3.

As each pulse 27 (FIG. 1) appears, it causes an interrupt or jump to the subroutine of FIG. 4 where progress through steps SP1 through SP5 results in computation and storage of an updated actual speed signal S. Thus, the interrupts occur with time spacings Te that decrease or increase as engine speed rises or falls; and, in effect, the sum of the latest four durations Te is found and signaled as the value Tcr, with a constant and essentially neglegible time delay after each interrupt is triggered.

After step SP5, the computer proceeds to step SP6 where subtraction of S from $S_d$ results in storing of a fresh value for the speed error E, as indicated in Eq. (34), supra.

At step SP7, the variable V is computed as the current error E plus the change in the error from the previous to the present iteration. This involves a "previous value" $E_{i-1}$ saved from the preceding iteration.

At step SP8, the current value of the product IT is computed and stored by arithmetical operations which conform to Eq. (36). It will be recalled from Eqs. (21) and (33) that, although the arithmetical procedure is extremely simple, this has a net effect tantamount to making the integral gain coefficient I automatically vary as the square of engine speed and essentially linearly with load torque.

The intermediate variable W is found and stored as a fresh value by the arithmetical operations in step SP9 which utilize the values of V and IT in accordance with Eq. (37). The variable W is incremented upwardly or downwardly by the amount V (IT) and this produces the integral action. The value $W_{i-1}$ has been saved from the preceding iteration.

At step SP10, the final output signal F is computed and stored by arithmetic computations conforming to Eq. (38) and utilizing the constant K3, thus being influenced by the compensation factor D. Obviously, the signal F will progressively increase or decrease when the engine fuel input rate must be increased or decreased to return the speed error E essentially to zero following any change in the load torque or the set point $S_d$ which results in a transient error.

At step SP11, the current value of the fuel signal F is read out to and stored at PORT 2. The output voltage from the DAC 15 (FIG. 1) is thus updated; if it is changed, then the actuator 14 shifts the rack 12 to physically change the fuel input rate to the commanded value.

Finally, during step SP12, the current values of F, W, and E are transferred into the "previous value" memory locations $F_{i-1}$, $W_{i-1}$ and $E_{i-1}$ where they are saved and made available for use during the next-succeeding iteration.

It will be apparent to those skilled in the art that the arithmetic computations within the computer pursuant to the program subroutine here described may be arranged with appropriate scaling factors and employ different dimensional units, as a mere matter of choice. And, of course, signals representing normalized rather than actual values may in some cases be used, again as a matter of choice.

The instruction program for (1) obtaining the effective actual value of speed—frequently and without prohibitively large phase lag, yet with masking of torsional speed fluctuations which would tend to make the actuator and rack mechanically vibrate and wear—and (2) for producing PID corrections of any speed errors, will be seen to be amazingly simple and short in comparison to other "computerized" speed governing control systems. By the simple program subroutine loaded into the computer memory and described with reference to FIG. 4, any speed error transients are removed with relatively quick response (high gain) and yet without instability or hunting. This is achieved by the automatic "open loop adaptive" adjustment of integral gain, stability and compensation factors through an algorithm of extreme simplicity. In net effect, it adjusts a factor IT according to changes in speed S and load $F_{i-1}$—(see Eq. (36)—in order to achieve the same result as if the integral gain I were being increased as the square of speed and linearly with load. It employs a constant—$K_1 = B_R/T_R$ in Eq. (35)—obtained from initial tuning at one operating point to achieve the same result as if the stability factor B were being changed as a linear inverse function of speed; and it employs a constant—$K_3 = D_R/T_R$ in Eq. (38)—obtained from initial tuning at one operating point to achieve the same result as if the compensation factor D were being changed essentially as an inverse function of speed.

The entire subroutine of FIG. 4 may be executed with what amounts to a very short amount of "computer time" (typically on the order of about 5 or 10 ms.). For an engine operating over a speed range of 20 to 100 r.p.m. and with $\theta$ equal to 90°, the subroutine is entered by interrupts at intervals nominally spaced apart by about 750 ms. to 150 ms. This leaves a very large amount of computer time available for carrying out other control and data logging or display tasks. Indeed, it is entirely feasible to execute the subroutine to carry out the real time operations described with an engine operating at speeds of 1000 r.p.m. or more. In such cases, it may not be necessary or desirable to make the signal Tcr represent elapsed time for a single whole revolution (360°) and to iterate the updating program subroutine Q times per single revolution. In the same sense that trigonometric functions have identical values for angles which are increased by multiples of 360° (e.g., $\sin \alpha = \sin(\alpha + n \cdot 360°)$, where n is any integer), the references to "one revolution" or to "360°" in the preceding description and in the appended claims should be understood as generically designating the equivalent of "n revolutions" or "n·360°", where n is any integer other than zero.

RESUME

In review, the problem of the actuator 14 and fuel rack 12 wearing themselves out by mechanical oscillations,—attempting to correctively adjust fuel rate in-between cylinder firings due to speed errors which seemingly exist due to torsional speed fluctuations,—has been overcome by the present invention. The method and apparatus for sensing and producing updated successive values of actual speed makes it impossible for the updated actual speed signal to reflect any of the effects of torsional speed fluctuations, or even speed fluctuations due to a "weak" cylinder.

The PID control system, constituted in major part by the program exemplified in FIG. 4, can be operated with a relatively higher integral gain without exhibiting instability than would be the case if the torsional speed fluctuations were reflected in the sensed speed signal S and the speed error E. Yet the "staleness" of the information fed back to create the signal S, and the phase lag, that would be entailed by updating only once per crankshaft revolution are avoided by updating Q times per revolution ($Q = 2, 3, 4 \ldots$) the sensed speed value,—while basing each updated value S upon the time for one whole revolution of the crankshaft. The latter aspect masks out all minor speed fluctuations and results in each value of S representing average of instantaneous speed over the span of one revolution so that high gain without instability can be used. The latter aspect eliminates unacceptably large phase lags and thus sluggish or slow elimination of transient speed errors.

Viewed in a broad sense, the invention may be practiced by obtaining Q updated values of elapsed time per revolution of the crankshaft, each such value being found for one whole revolution immediately after the crankshaft has rotated through successive predetermined angles $\Delta\theta_1, \Delta\theta_2 \ldots \Delta\theta_q$ which need not be equal but whose sum is equal to one revolution (360°). The one revolution period Tcr is found as the elapsed time between the instant that one of the angular increments $\Delta\theta_x$ has been completed and the instant that the same angular increment $\Delta\theta_x$ is next completed, as represented for example in Eq. (10). From this, the updated value of speed S is easily found by the reciprocal computation of Eq. (12).

Yet, that determination of Tcr and S is freshly made Q times per revolution.

In the preferred practice of the invention, the predetermined angles $\Delta\theta_1, \Delta\theta_2 \ldots \Delta\theta_q$ are all made equal and of an extent which is an integer submultiple of 360°. In the specific embodiment treated above, Q is chosen as 4 and $\Delta\theta_1 = \Delta\theta_2 = \Delta\theta_3 = \Delta\theta_4 = 90°$. This makes the interrupts which result in a fresh determination of Tcr appear at instants after each 90° of crankshaft rotation and which are spaced apart by elapsed times Te which are nominally equal.

There is a preferred relation between the chosen value for Q and the number which characterizes the quantity of cylinder firings per revolution. For a two-cycle engine of N cylinders, there are C firings per revolution, where $C = N$. For a four-cycle engine of N cylinders, there are C firings per revolution where $C = N/2$. The firing frequency is C times the crankshaft rotation frequency. For any given engine, it is preferred that Q be chosen as equal to C (as in the example described, where $C = Q = 4$). This provides the least phase lag because the updating of the sensed speed signal S and the fuel rate signal F then occurs at the shortest useful intervals. If Q is chosen to be an integer less than C but greater than 1, the phase lag will be less than that for "once per revolution" updating but greater than that for $Q = C$. On the other hand if Q is chosen to be greater than C, the updating will be more frequent than if $Q = C$ and the signal F will readjust the fuel rack more frequently and with even less phase lag. But in such case, this will not result in more frequent changes in the rate of fuel actually fed to a cylinder because the instants of fuel injection into a cylinder occur at the same rate as the instants at which such cylinders fire. The position of the fuel rack in between the instants of fuel injection are of no significance; and to readjust the fuel rack position more frequently than the cylinder firing rate is of no benefit in controlling fuel input rate.

Of surprising nature is the fact that the accuracy of each updated sensed speed value S, and its immunity to instantaneous speed fluctuations at any frequency greater than crankshaft rotation frequency, is wholly unaffected by the phase angle between (i) the firing instants FI and the torsional oscillation waveform 40 (FIG. 2) and (ii) the instants t when the pulses 27 appear to trigger an updating of the value S.

The subroutine for PID action to remove any speed errors synergisticly cooperates with the speed sensing method and apparatus. The latter is founded upon finding elapsed times between instants when the crankshaft completes each predetermined $\Delta\theta$ of rotation—and those instants are spaced by intervals Te which vary rather widely as speed changes over a large operational range. The subroutine creates and has available a fresh value of S at, or with a very short and constant delay after, each of these instants. Thus, the sampling and iteration rate of the PID correction of the fuel rate is a variable—as contrasted to regularly timed interrupts—, and because of this, very simple program steps utilizing predetermined constants can be iterated at the variable rate to produce the net effect of open loop adaptive tuning, i.e., in effect correctively changing I, B and D as speed and load change widely within the operational region (FIG. 5) of the engine and its driven load device.

I claim:

1. A method for controlling a desired rotational speed ($S_d$) of a rotating shaft of an engine driving a variable load, the rotating shaft having a plurality of markers circumferentially distributed about the shaft, the method comprising the steps of:
   determining time periods (T) for whole revolutions of each of the markers past a reference point;
   determining an average time period for the determined time periods (T);
   deriving an operating speed (S) of the rotating shaft based on the averaged time period;
   generating a value of a common signal (F) for each of the markers from a proportional-integral-derivative (PID) function related to an error between the desired speed ($S_d$) of said shaft and the operating speed (S) of the shaft, wherein the PID function is defined according to the relation:

$$F = \frac{\frac{I_R T_R}{S_R}\left(1 - \frac{F_{i-1}}{F_{max}}\right)S}{1 - z^{-1}}\left[\frac{B_R}{T_R}(1 - z^{-1}) + 1\right]\left[\frac{D_R}{T_R}(1 - z^{-1}) + 1\right](S_d - S)$$

controlling the speed of the shaft in response to the value of the command signal (F); and updating the command signal (F) for every whole revolution of each of the markers.

2. The method as set forth in claim 1 where:

$z^{-1}$ represents a mathematical operator;

$I_R$ is a predetermined constant representing an integral gain factor;

each $T_R$ is a predetermined constant representing a time period for a whole rotation of a marker at a top speed or a variable inversely proportional to the operating speed;

each $S_R$ is a predetermined constant representing the top speed of the rotating shaft or a variable representing the operating speed (S);

$F_{i-1}$ is a previous value of the command signal (F), which is substantially proportional to the torque of the load;

$F_{max}$ is a predetermined constant representing a maximum value of the command signal (F);

$B_R$ is a predetermined constant representing a stability factor; and $D_R$ is a predetermined constant representing a compensation factor.

* * * * *